United States Patent
Sanchez et al.

(10) Patent No.: US 9,646,433 B1
(45) Date of Patent: May 9, 2017

(54) SYSTEMS AND METHODS FOR USING IMAGE DATA TO GENERATE VEHICLE OPERATION LOGS

(71) Applicant: STATE FARM MUTUAL AUTOMOBILE INSURANCE COMPANY, Bloomington, IL (US)

(72) Inventors: Kenneth Jason Sanchez, Bloomington, IL (US); Aaron Scott Chan, Lisle, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 14/862,949

(22) Filed: Sep. 23, 2015

(51) Int. Cl.
| | | |
|---|---|---|
| G06K 9/00 | (2006.01) | |
| H04N 7/18 | (2006.01) | |
| G07C 5/08 | (2006.01) | |
| G06K 9/62 | (2006.01) | |

(52) U.S. Cl.
CPC ......... *G07C 5/085* (2013.01); *G06K 9/00255* (2013.01); *G06K 9/00288* (2013.01); *G06K 9/6201* (2013.01); *G07C 5/0808* (2013.01)

(58) Field of Classification Search
USPC ................... 382/118, 104; 348/148; 701/523
See application file for complete search history.

(56) References Cited

U.S. PATENT DOCUMENTS

| | | | | |
|---|---|---|---|---|
| 6,198,996 B1* | 3/2001 | Berstis | ................ | B60R 25/2018 |
| | | | | 701/36 |
| 7,116,803 B2* | 10/2006 | Lemelson | ............ | B60Q 1/0023 |
| | | | | 307/10.5 |
| 7,439,847 B2* | 10/2008 | Pederson | ........... | G07C 9/00158 |
| | | | | 340/5.81 |
| 7,552,008 B2* | 6/2009 | Newstrom | ........ | G06F 17/30241 |
| | | | | 340/988 |
| 8,098,894 B2* | 1/2012 | Soderstrom | ....... | G06F 17/30241 |
| | | | | 348/116 |
| 8,238,617 B2* | 8/2012 | Omoto | .................... | B60R 25/04 |
| | | | | 382/115 |
| 8,306,269 B2* | 11/2012 | Nakamori | .......... | G06K 9/00798 |
| | | | | 340/425.5 |
| 8,498,805 B2* | 7/2013 | Joong | ................ | G01C 21/3605 |
| | | | | 382/103 |

(Continued)

OTHER PUBLICATIONS

Aaron Scott Chan et al., U.S. Appl. No. 14/841,875, filed Sep. 1, 2015. "*Systems and Methods for Assessing Risk Based on Driver Gesture Behaviors.*"

(Continued)

*Primary Examiner* — Kathleen Y Dulaney
(74) *Attorney, Agent, or Firm* — Marshall, Gerstein & Borun LLP; Randall G. Rueth

(57) ABSTRACT

Systems and methods for generating vehicle operation logs are provided. According to certain aspects, an electronic device may receive and analyze image data depicting an individual located within a vehicle. The electronic device may also interface with a set of sensors to retrieve or access relevant data related to the operation of the vehicle, such as time and date information, location information, and other data. The electronic device may generate a vehicle operation log that associates the individual depicted in the image data with the vehicle operating parameters.

14 Claims, 5 Drawing Sheets

(56) References Cited

U.S. PATENT DOCUMENTS

| | | | |
|---|---|---|---|
| 8,738,523 B1 | 5/2014 | Sanchez et al. | |
| 8,891,823 B2* | 11/2014 | Sato | G01S 5/0252 |
| | | | 382/103 |
| 8,953,841 B1* | 2/2015 | Leblang | G06K 9/00671 |
| | | | 345/633 |
| 8,954,340 B2 | 2/2015 | Sanchez et al. | |
| 9,135,803 B1 | 9/2015 | Fields et al. | |
| 2004/0249570 A1* | 12/2004 | Vollmer | G01C 21/3641 |
| | | | 701/431 |
| 2005/0096836 A1* | 5/2005 | Minami | G08G 1/20 |
| | | | 701/123 |
| 2005/0159889 A1* | 7/2005 | Isaac | G01C 21/3484 |
| | | | 701/414 |
| 2006/0173841 A1* | 8/2006 | Bill | G01C 21/3407 |
| 2007/0159309 A1* | 7/2007 | Ito | G06F 19/363 |
| | | | 340/425.5 |
| 2010/0036560 A1* | 2/2010 | Wright | B60R 16/037 |
| | | | 701/36 |
| 2010/0049397 A1* | 2/2010 | Liu | G08G 1/096833 |
| | | | 701/31.4 |
| 2010/0208070 A2* | 8/2010 | Haynes | G07C 5/085 |
| | | | 348/148 |
| 2013/0079971 A1* | 3/2013 | Raghunathan | G07C 5/008 |
| | | | 701/31.4 |
| 2014/0309865 A1* | 10/2014 | Ricci | H04W 48/04 |
| | | | 701/36 |

OTHER PUBLICATIONS

Brian Mark Fields et al., U.S. Appl. No. 14/503,717, filed Oct. 1, 2014. "*Alert Operation Detection.*"
Brian Fields et al., U.S. Appl. No. 14/201,491, filed Mar. 7, 2014. "*Vehicle Operator Emotion Management System and Method.*"

* cited by examiner

SYSTEMS AND METHODS FOR USING IMAGE DATA TO GENERATE VEHICLE OPERATION LOGS

TECHNICAL FIELD

The present disclosure is directed to detecting and recording parameters associated with vehicle operation. More particularly, the present disclosure is directed to systems and methods for using image data to identify individuals within a vehicle, and generating a vehicle operation log related to operation of the vehicle.

BACKGROUND

Individuals have been operating and traveling in vehicles as a means of transportation for decades. With the increasing prevalence of electronic devices and sensors, there are available more components to generate data associated with vehicle operation. For example, vehicle sensors can measure or detect vehicle location, acceleration, general movement, and other information. There are existing applications that use this data to facilitate certain functionalities. For example, vehicle operators are able to share their velocity with other vehicle operators so that the other operators may gauge certain traffic conditions.

However, there are no existing solutions for effectively and efficiently compiling and recording certain vehicle operation parameters. Further, there are no existing solutions for accurately associating certain vehicle operators with particular vehicle operation data. Accordingly, there is an opportunity for systems and methods to leverage various data to associate vehicle operators with vehicles, and compile and record vehicle operation data associated therewith.

SUMMARY

A computer-implemented method in an electronic device of generating a vehicle operation log associated with operation of a vehicle may be provided. The method may include receiving image data from at least one image sensor located within the vehicle, analyzing, by a computer processor, the image data to identify an operator of the vehicle, identifying a current time corresponding to approximately when the image data is received, detecting that the vehicle is currently in motion, and in response to detecting that the vehicle is currently in motion, generating the vehicle operation log to indicate the operator of the vehicle and the current time.

In another embodiment, a system in an electronic device for generating a vehicle operation log associated with operation of a vehicle may be provided. The system may include a memory configured to store non-transitory computer executable instructions, and a processor configured to interface with the memory. The processor may be configured to execute the non-transitory computer executable instructions to cause the processor to receive image data from at least one image sensor located within the vehicle, analyze the image data to identify an operator of the vehicle, identify a current time corresponding to approximately when the image data is received, detect that the vehicle is currently in motion, and in response to detecting that the vehicle is currently in motion, generate the vehicle operation log to indicate the operator of the vehicle and the current time.

DETAILED DESCRIPTION

Figure 1A:
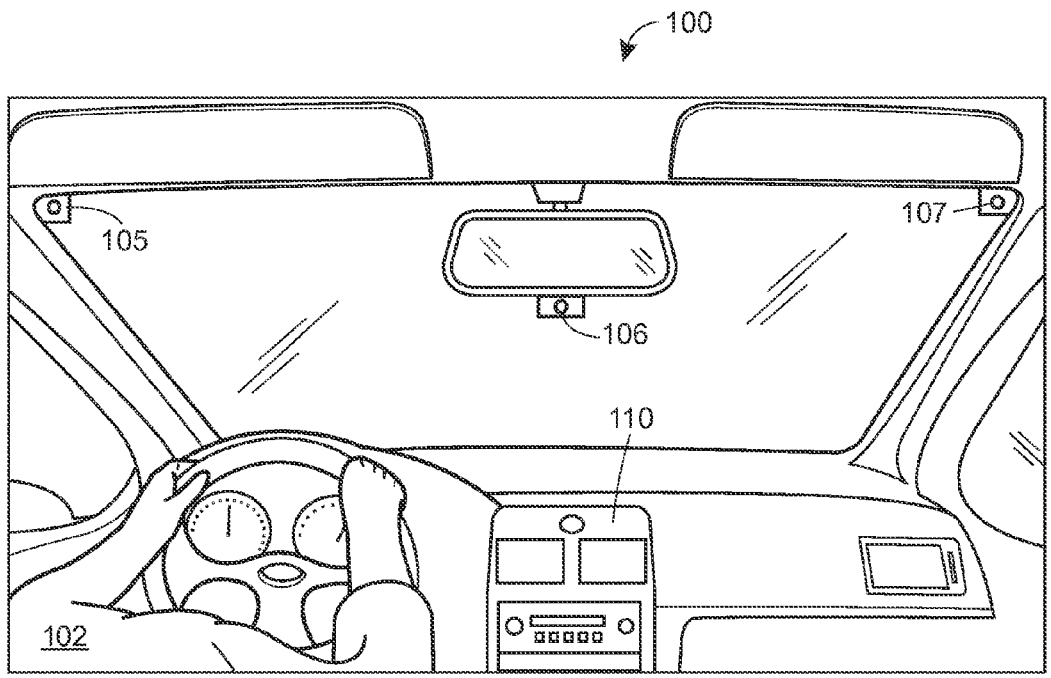
FIGS. 1A and 1B depict exemplary environments within a vehicle including various components configured to facilitate various functionalities, in accordance with some embodiments.

The present embodiments may relate to, inter alia, detecting, recording, and compiling various vehicle operation data. Existing vehicle operation environments support the generation of various vehicle operation data. However, there is no way to properly compile the vehicle operation data with certain associations or pairings in a meaningful manner to enable the data to be effectively analyzed and used for subsequent applications or inspections. The present embodiments improve these shortcomings by effectively and efficiently organizing the vehicle operation data for subsequent retrieval and/or analysis.

According to certain aspects, a vehicle or an electronic device within the vehicle may be equipped with one or more image sensors. The image sensor(s) may be configured to capture image data of an operator (or a passenger(s)) of the vehicle and transmit the captured image data to an electronic device. After receiving the image data, the electronic device may access stored user profile data that may include physical characteristics of a set of users. The electronic device may analyze the received image data by comparing the received image data to the stored user profile data to identify an individual depicted in the received image data, where the individual may be an operator or a passenger of the vehicle.

Further, the electronic device may determine or identify certain vehicle operation parameters, including but not limited to time and/or date, location data, and route information. The electronic device may compile the data to associate the compiled vehicle operation parameters with the indication of the individual. The electronic device may further store the data by, for example, generating a vehicle operation log that may indicate the individual and the compiled vehicle operation parameters.

The systems and methods therefore offer numerous benefits. In particular, the individual may review the vehicle operation log to review or recall certain information, or to analyze certain information in an attempt to make various improvements (e.g., identify a most efficient route to work). Further, an individual, entity, or the like may access the vehicle operation log for various purposes or applications. For example, an insurance provider may access the vehicle operation log and, based on the data include in the vehicle operation log, may generate a quote for a vehicle insurance policy. For further example, a parent may access the vehicle operation log to monitor vehicle travel by one or more children. It should be appreciated that other benefits are envisioned.

The systems and methods discussed herein address a challenge that is particular to vehicle operation. In particular, the challenge relates to a difficulty in interpreting the multiple types of data associated with operating vehicles. This is particularly apparent with the increasing amount of vehicle sensors and types of data generated therefrom. In conventional environments, the data is generated and reviewed without any sort of data correlation or log generation. In contrast, the systems and methods automatically correlate certain types of data as the data is recorded or generated, which results in effectively compiled data that may be used for various applications and interpretations. Therefore, because the systems and methods employ the collection, compiling, and storing of data associated with vehicle, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data in combination with stored user profile data to identify individual(s) depicted in the image data, associate various vehicle operation parameters with the identified individual, and generate a vehicle operation log that may be accessed and analyzed. This combination of elements further impose meaningful limits in that the operations are applied to improve vehicle data compiling by associating multiple types of distinct data in a meaningful and effective way.

According to implementations, the systems and methods may support a dynamic, real-time or near-real-time analysis of any captured, received, and/or detected data. In particular, the electronic device may receive or capture image data in real-time or near real-time, and may automatically and dynamically analyze the captured image data by comparing the captured image data to stored profile data. The electronic device may also receive or detect certain vehicle operation parameters in real-time or near-real-time, and may automatically and dynamically associate and/or compile the image data and the vehicle operation parameters. In this regard, the individual indicated in the data or accessing the data is afforded the benefit of an accurate and meaningful compilation of data. Further, any individual may access and analyze the data in real-time or near-real-time to efficiently and effectively facilitate any functionalities or processing.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view minor. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, and/or other sensors.

Figure 1B:
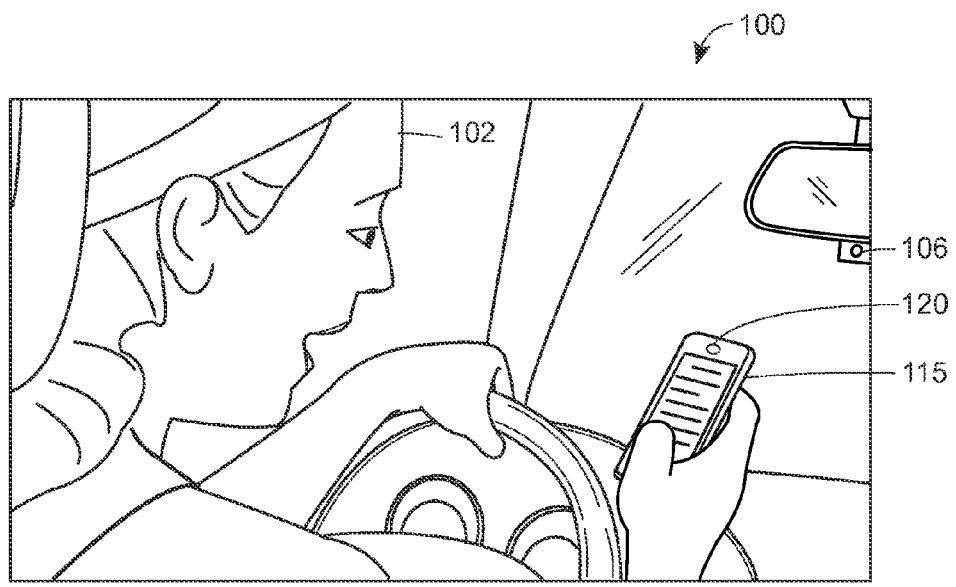

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. The electronic devices 110, 115 may further interface with the various sensors or other components to assess real-time environmental parameters associated with operation of the vehicle 100 (e.g., speed, location, route information, current time, current date). The electronic devices 110, 115 may generate a vehicle operation log that may indicate the identified individual and may include any of the vehicle operation parameters, where the vehicle operation log may be later accessed and examined for various applications. The electronic devices 110, 115 may also provide, in real-time, near real-time, or at another time, the generated vehicle operation log to a third party entity or device (e.g., an insurance provider).

According to embodiments, an individual may manually access and examine the vehicle operation log, or a computing device may automatically access and examine the vehicle operation log, to facilitate the various applications. For example, an insurance provider may automatically analyze the vehicle operation log to generate a vehicle insurance policy quote according to the data included in the vehicle operation log. Accordingly, the insurance provider may generate the vehicle insurance policy quote in real-time or near-real-time to when the electronic device 110, 115 generates the vehicle operation log. Further, the insurance provider may provide the vehicle insurance policy quote to the individual 102, such as when the individual 102 is still operating the vehicle or otherwise in real-time or near-real-time to generation of the vehicle operation log, where the individual 102 may select to purchase the vehicle insurance policy.

Figure 2:
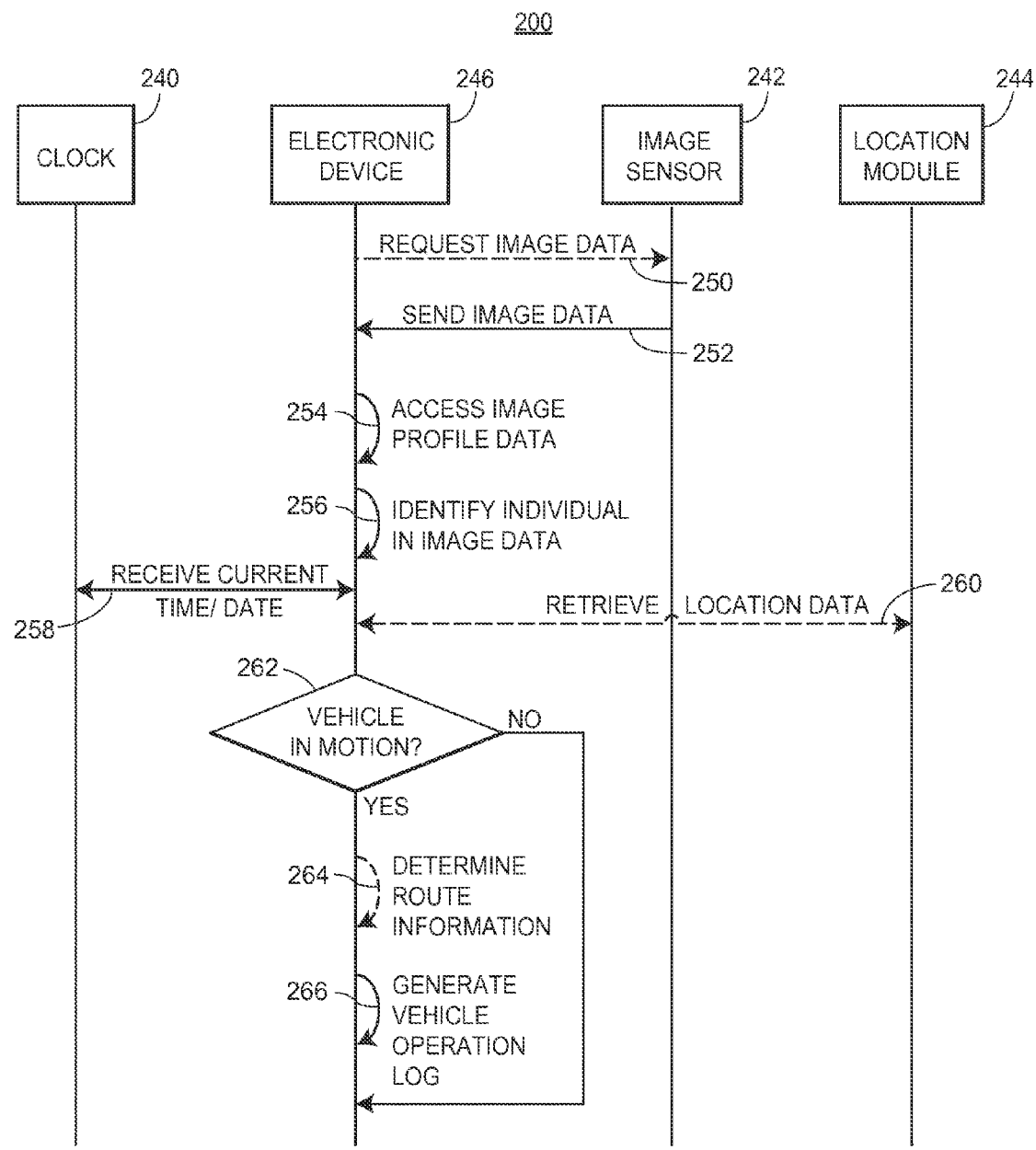
FIG. 2 depicts an exemplary signal diagram associated with analyzing image data to identify individuals associated with a vehicle and generating a vehicle operation log, in accordance with some embodiments.

FIG. 2 depicts a signal diagram 200 associated with facilitating certain functionalities associated with the systems and methods. The signal diagram 200 includes a set of components that may be associated with a vehicle: a clock 240 or similar component configured to identify and/or maintain a current time and date, an electronic device 246 (such as one of the electronic devices 110, 115 as discussed with respect to FIGS. 1A and 1B), an image sensor 242 (such as one of the image sensors 105, 106, 107, 120 as discussed with respect to FIGS. 1A and 1B), and a location module 244.

The signal diagram 200 may begin when the electronic device 246 optionally requests (250) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image (s), real-time video, image(s) and/or video recorded five minutes ago). It should be appreciated that the image sensor 242 may be internal to or external from the electronic device 246.

The image sensor 242 may send (252) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. It should be appreciated that the image data may depict a vehicle operator or a passenger of the vehicle.

The electronic device 246 may access (254) image profile data associated with one or more individuals. In embodiments, the one or more individuals may be registered or otherwise associated with the vehicle (e.g., one or more registered drivers of the vehicle). The electronic device 246 may access the image profile data from local memory or from remote storage via a network connection. According to embodiments, the image profile data may include a set of attributes, characteristics, and/or the like that may be related to the one or more individuals. For example, the image profile data may include facial recognition data related to relative positions, sizes, and/or shapes of the eyes, noses, cheekbones, jaws, and/or other features of the one or more individuals.

The electronic device 246 may identify (256) an individual depicted in the image data based on an analysis of the received image data and the accessed image profile data. According to the embodiments, the individual depicted in the image data may be the vehicle operator or a passenger of the vehicle. In one implementation, the electronic device 246 may perform a facial recognition algorithm or technique using the received image data to determine that the facial features of an individual depicted in the received image data matches those corresponding to an individual included in the image profile data. It should be appreciated that other types of calculations, algorithms, comparisons, or techniques are envisioned.

The electronic device 246 may retrieve (258) the current time and/or date from the clock 240. In an implementation, the electronic device 246 may retrieve the current time and/or data in response to receiving the image data from the image sensor, in response to identifying the individual depicted in the image data, or in response to another trigger. It should be appreciated that the clock 240 may be included as part of the electronic device 246. In an implementation, the clock 240 may be a component of the vehicle, such as an on-board system of the vehicle, or as part of an auxiliary device.

The electronic device 246 may also optionally retrieve (260) location data from the location module 244. In embodiments, the location data may be in the form of GPS coordinates, or other similar location data. The electronic device 246 may retrieve the location data at multiple points in time, which may indicate movement and/or a direction of travel. In an implementation, the electronic device 246 may retrieve the location data in response to receiving the image data from the image sensor, in response to identifying the individual depicted in the image data, or in response to another trigger. It should be appreciated that the location module 244 may be included as part of the electronic device 246. In an implementation, the location module 244 may be a component of the vehicle, such as an on-board system of the vehicle, or as part of an auxiliary device, such as a GPS unit.

The electronic device 246 may determine (262) whether the vehicle is in motion or otherwise operating. In an implementation, the electronic device 246 may determine motion or operation based on data from one or more motion or location sensors, such as an accelerometer, a gyroscope, the location module 244, and/or another sensor. The electronic device 246 may also interface with a speedometer of the vehicle to determine whether the vehicle is in motion. In an implementation, the electronic device 246 may determine whether the vehicle is in motion or operating in response to receiving the image data from the image sensor, in response to identifying the individual depicted in the image data, in response to retrieving the location data, or in response to another trigger. In some embodiments, the electronic device 246 may determine that the vehicle was in motion or operating previous to making the determination. For example, the electronic device 246 may determine that the vehicle is stopped at a stop light, if the engine of the vehicle is on and the vehicle was recently in motion.

If the electronic device 246 determines that the vehicle is not in motion ("NO"), such as if the individual is present in the vehicle but the vehicle is not operating, then processing may end or proceed to another functionality. In contrast, if the electronic device 246 determines that the vehicle is in motion or operating ("YES"), then the electronic device 246 may optionally determine (264) route information associated with operation of the vehicle. In particular, the route information may include any roads, streets, or the like on which the vehicle has traveled, along with any time of operation. To determine the route information, the electronic device 246 may interface with one or more local components (e.g., a location module), and/or with any components of the vehicle such as an on-board system. The route information may correspond to a current "trip" of the vehicle, or may include one or more past trips of the vehicle.

The electronic device 246 may also generate (266) a vehicle operation log that includes at least a portion of the determined or accessed information. In particular, the vehicle operation log may include an identification of the individual, an indication of whether the individual is the operator or a passenger, a current time and/or a current date, a location of the vehicle, any determined route information, and/or any other information. Accordingly, the vehicle operation log may provide an accurate snapshot of operation of the vehicle that may be accessed by one or more users or entities.

Figure 3:
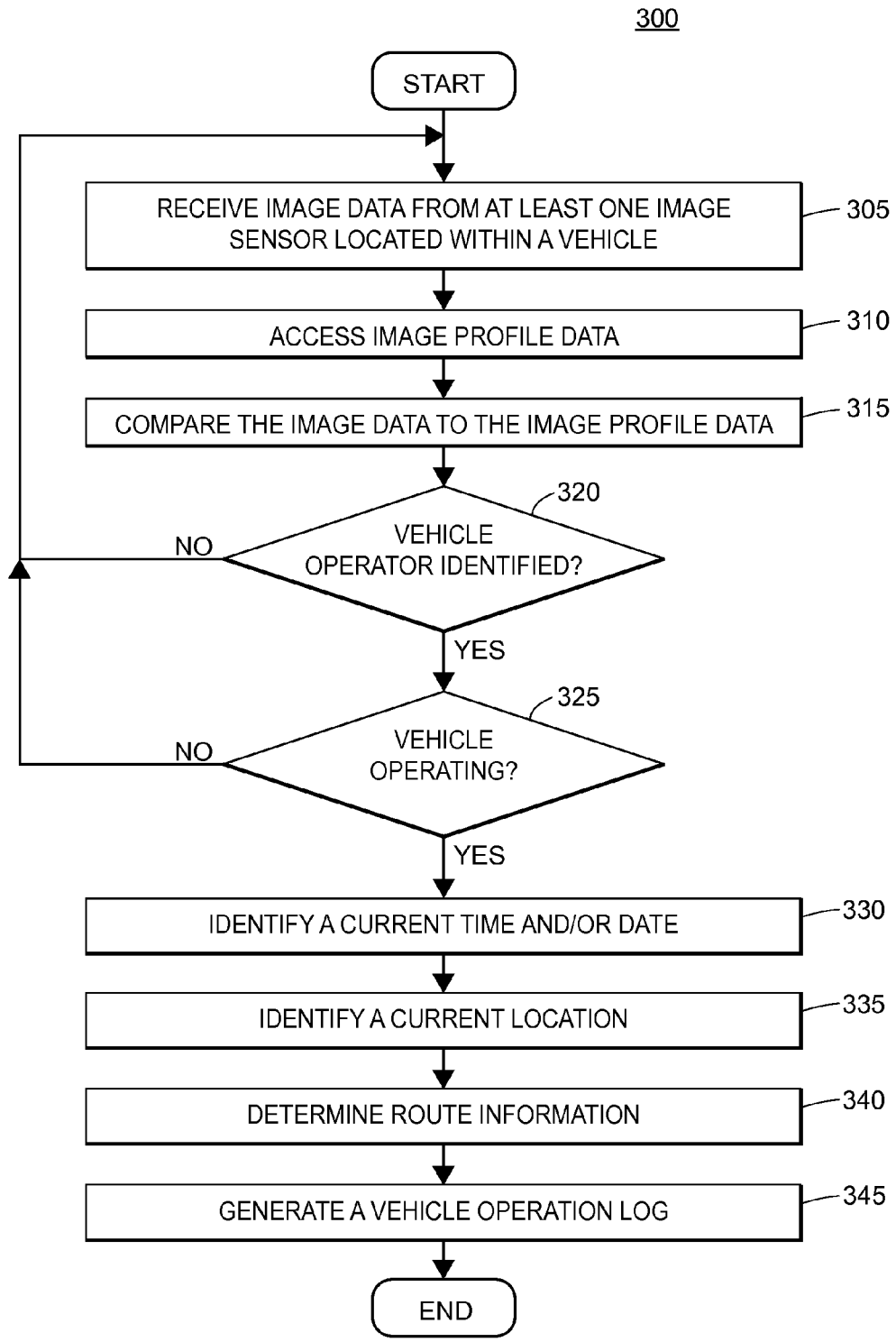
FIG. 3 depicts an exemplary flow diagram associated with analyzing image data to identify individuals associated with a vehicle and generating a vehicle operation log, in accordance with some embodiments.

FIG. 3 depicts is a block diagram of an exemplary method 300 of generating a vehicle operation log. The method 300 may be facilitated by an electronic device that may be located within a vehicle or incorporated as part of the vehicle. The electronic device may support execution of a dedicated application that may facilitate the functionalities of the method 300. Further, the electronic device may enable a user or individual (e.g., an operator of the vehicle) to make various selections and facilitate various functionalities.

The method 300 may begin when the electronic device receives (block 305) image data from at least one image sensor located within the vehicle. In embodiments, the image sensor may be a component of the electronic device itself or may be external to the electronic device. Further, the image data may be received in real-time or near real-time as the at least one image sensor captures the image data. After receiving the image data, the electronic device may access (block 310) image profile data associated with a set of individuals. In some embodiments, the set of individuals may be registered to or otherwise associated with the vehicle. Further, the image profile data may indicate physical characteristics (e.g., facial features) of the corresponding set of individuals.

The electronic device may compare (block 315) the image data to the image profile data. In one implementation, the electronic device may perform a facial recognition analysis using the image data and the image profile data. It should be appreciated that alternate or additional analyses, techniques, calculations, algorithms, or the like are envisioned. The electronic device may determine (block 320) whether the vehicle operator is identified from the comparison conducted in block 315. If the vehicle operator is not identified ("NO"), processing may return to block 305 at which additional image data may be received, or processing may end or proceed to other functionality.

In contrast, if the vehicle operator is identified ("YES"), the electronic device may determine (block 325) whether the vehicle is operating. In particular, the electronic device may determine whether the vehicle is operating using various sensor or other operating parameters of the vehicle. For example, the electronic device may receive location data, acceleration data, sensor data from an ignition of the vehicle, or other data that may indicate whether the vehicle is operating. Generally, the electronic device may consider the vehicle to be operating if the engine of the vehicle is activated or "ON", and/or if the vehicle is in motion.

If the vehicle is not operating ("NO"), processing may return to block 305 at which additional image data may be received, or processing may end or proceed to other functionality. In contrast, if the vehicle is operating ("YES"), the electronic device may identify (block 330) a current time and/or a current date. In particular, the electronic device may interface with an integrated or external clock component to access the current time and/or the current date. Further, the electronic device may identify (block 335) a current location. In particular, the electronic device may interface with an integrated location module (e.g., a GPS chip) or an external location module (e.g., an on-board GPS system of the vehicle) to access the current location. It should be appreciated that the electronic device may identify the current time, the current date, and/or the current location in response to receiving the image data of block 305, or at any other point of the method 300.

The electronic device may determine (block 340) route information based at least in part of the location identified in block 335. In particular, the electronic device may identify any roadways on which the vehicle has operated. The route information may account for varied time periods, including time periods prior to the image data being received. The electronic device may generate (block 345) a vehicle operation log that may include any of the determined or identified data. In particular, the vehicle operation log may include an indication of the vehicle operator, a current time, a current date, a current location, route information, and/or any other data.

Figure 4A:
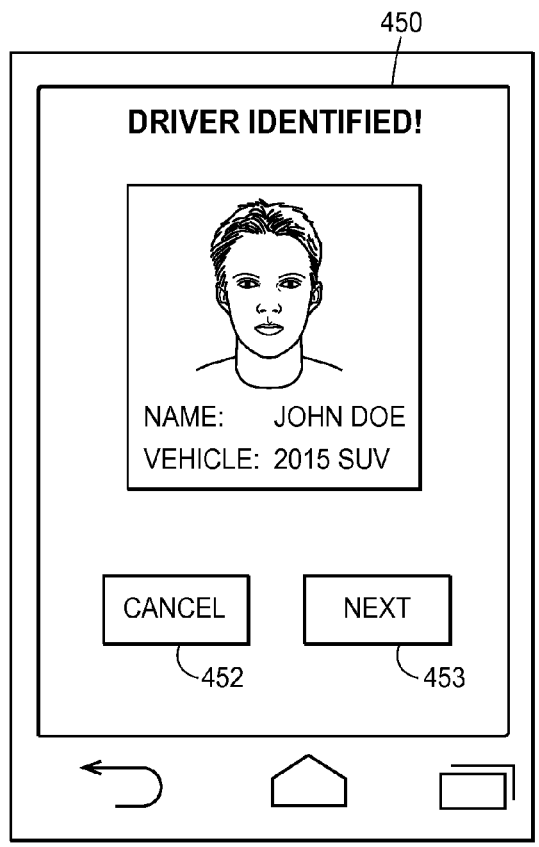
FIGS. 4A and 4B depict exemplary user interfaces associated with generating vehicle operation logs, in accordance with some embodiments.
Figure 4B:
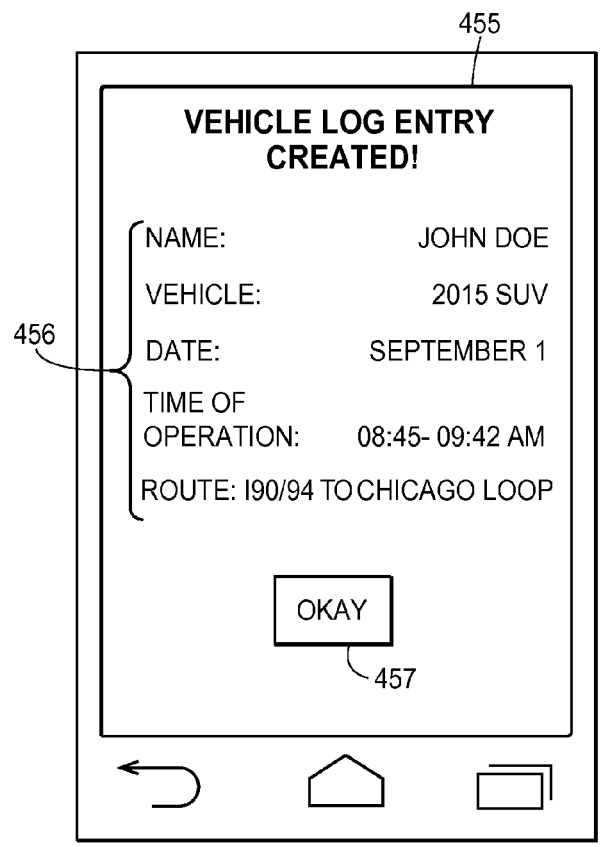

FIGS. 4A and 4B illustrate exemplary interfaces associated with generating a vehicle operation log using detected or determined vehicle operation parameters. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 4A illustrates an interface 450 associated with the identification of an individual depicted in image data. The interface 450 may include an information box 451 that identifies the individual (as shown: John Doe) and the vehicle (as shown: 2015 SUV). In embodiments, the electronic device may identify the individual and the vehicle using image data received when the individual is operating the vehicle. The interface 450 may include a "CANCEL" selection 452 that enables an accessing user to select to dismiss the interface 450 and a "NEXT" selection 453 that enables an accessing user to select to proceed to a subsequent interface.

FIG. 4B illustrates an additional interface 455 associated with a vehicle operation log. In some embodiments, the electronic device may display the additional interface 455 in response to the user selecting the "NEXT" selection 453. The interface 455 indicates that a vehicle log entry has been created, where the vehicle log entry may include a set of information 456. As illustrated in FIG. 4B, the set of information 456 may include a vehicle operator name (as shown: John Doe), the vehicle (as shown: 2015 SUV), a date (as shown: September 1), a time of operation (as shown: 08:45-09:42 AM), and a route (as shown: 190/94 to Chicago Loop). It should be appreciated that the interface 455 may include alternate or additional information. The interface 455 may also include an "OKAY" selection 457 that enables the user to select to dismiss the interface 455.

Figure 5:
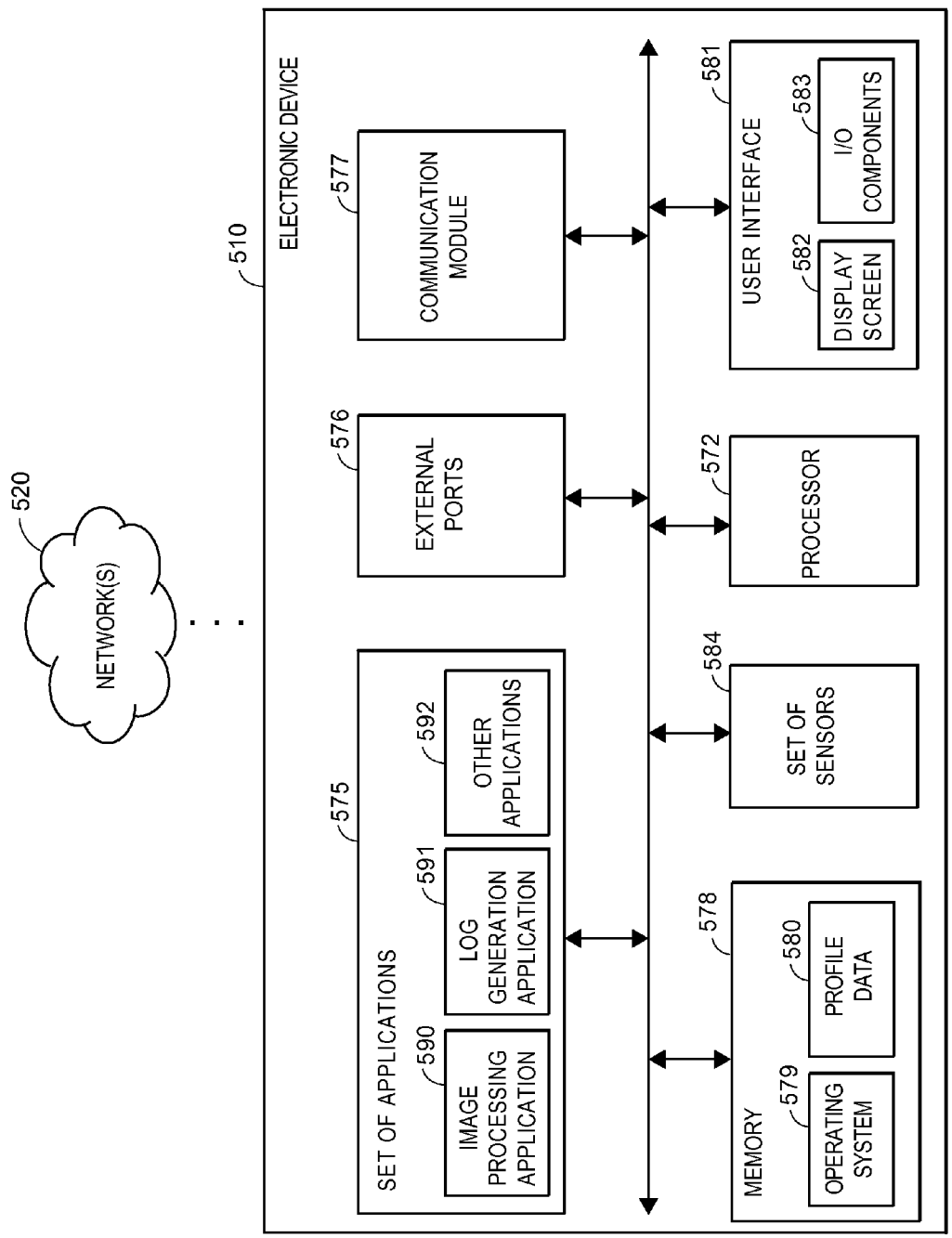
FIG. 5 is a block diagram of an exemplary electronic device, in accordance with some embodiments.

FIG. 5 illustrates a diagram of an exemplary mobile or other electronic device 510 (such as one of the electronic devices 110, 115 as discussed with respect to FIG. 1) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify individuals depicted in the image data, and a log generation application 591 configured to interface with sensors and generate vehicle operation logs that may include various vehicle operation parameters. It should be appreciated that one or more other applications 592 are envisioned.

The processor 572 may interface with the memory 578 to execute the operating system 579 and the set of applications 575. According to some embodiments, the memory 578 may also include profile data 580 that may include data associated with a set of individuals associated with a vehicle. In some implementations, the image processing application 590 may interface with the profile data 580 to retrieve appropriate profile data and compare the profile data to received image data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, image data from a set of image sensors. For further example, the communication module 577 may transmit data to and receive data from a remote insurance provider via the network 520.

The electronic device 510 may further include a set of sensors 584. The processor 572 and the set of applications 575 may interface with the set of sensors 584 to retrieve and process the corresponding sensor data. The set of sensors 584 may include, for example, a location module, an accelerometer, a gyroscope, one or more image sensors, and/or the like. In one particular implementation, the log generation application 591 may use various data from the set of sensors 584 to generate vehicle operation logs.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of generating a vehicle operation log associated with operation of a vehicle, the method comprising:
    receiving, at a first time, first image data from at least one image sensor, wherein the at least one image sensor is located within the vehicle;
    receiving, at a second time after the first time, second image data from the at least one image sensor;
    analyzing, by a computer processor, the first image data and the second image data to identify an operator of the vehicle;
    in response to identifying the operator of the vehicle:
        identifying a current time corresponding to approximately when the second image data is received,
        detecting that the vehicle is operating, and
        retrieving, from a location module, location data indicating a location of the vehicle at the current time;
    determining, from the location data, route information associated with operation of the vehicle, the route information identifying a set of roadways on which the vehicle has operated;
    generating the vehicle operation log to indicate the operator of the vehicle, the current time, and the route information;
    analyzing, at a third time after the second time, the route information included in the vehicle operation log to identify an efficient route; and
    displaying, in a user interface, an interface indicating the vehicle operation log, the interface identifying, concurrently, (i) the operator of the vehicle, (ii) the vehicle, and (iii) at least a portion of the route information.

2. The computer-implemented method of claim 1, wherein receiving the first image data and the second image data comprises:
    receiving the first image data and the second image data from the at least one image sensor included in the electronic device.

3. The computer-implemented method of claim 1, wherein analyzing the first image data and the second image data to identify the operator of the vehicle comprises:
    accessing image profile data associated with the operator of the vehicle; and
    comparing the first image data and the second image data to the image profile data to determine that the operator of the vehicle is depicted in the first image data and the second image data.

4. The computer-implemented method of claim 3, wherein comparing the first image data and the second image data to the image profile data comprises:
    performing a facial recognition analysis using the first image data, the second image data, and the image profile data; and
    based on a result of the facial recognition analysis, determining that the operator of the vehicle is depicted in the first image data and the second image data.

5. The computer-implemented method of claim 1, wherein identifying the current time comprises:
    identifying the current time and a current date;
    and wherein generating the vehicle operation log comprises:
    generating the vehicle operation log to indicate the operator of the vehicle, the current time, the route information, and the current date.

6. The computer-implemented method of claim 1, wherein detecting that the vehicle is operating comprises:
    retrieving the location data from the location module of the electronic device; and
    determining, from the location data, that the vehicle is currently in motion.

7. The computer-implemented method of claim 1, wherein detecting that the vehicle is operating comprises:
    receiving, from an on-board sensor of the vehicle, an indication that the vehicle is in motion.

8. A system in an electronic device for generating a vehicle operation log associated with operation of a vehicle, comprising:
    a location module configured to generate location data;
    a user interface;
    a memory configured to store non-transitory computer executable instructions; and
    a processor configured to interface with the memory, the location module, and the user interface, wherein the processor is configured to execute the non-transitory computer executable instructions to cause the processor to:
        receive, at a first time, first image data from at least one image sensor located within the vehicle,
        receive, at a second time after the first time, second image data from the at least one image sensor,
        analyze the first image data and the second image data to identify an operator of the vehicle,
        in response to identifying the operator of the vehicle:
            identify a current time corresponding to approximately when the second image data is received,
            detect that the vehicle is operating, and
            retrieve, from the location module, the location data indicating a location of the vehicle at the current time,
        determine, from the location data, route information associated with operation of the vehicle, the route information identifying a set of roadways on which the vehicle has operated,
        generate the vehicle operation log to indicate the operator of the vehicle, the current time, and the route information,
        analyze, at a third time after the second time, the route information included in the vehicle operation log to identify an efficient route, and cause the user interface to display an interface indicating the vehicle operation log, the interface identifying, concurrently, (i) the operator of the vehicle, (ii) the vehicle, and (iii) at least a portion of the route information.

9. The system of claim 8, wherein to receive the first image data and the second image data, the processor is configured to:
receive the first image data and the second image data from the at least one image sensor included in the electronic device.

10. The system of claim 8, wherein to analyze the first image data and the second image data to identify the operator of the vehicle, the processor is configured to:
access image profile data associated with the operator of the vehicle, and
compare the first image data and the second image data to the image profile data to determine that the operator of the vehicle is depicted in the first image data and the second image data.

11. The system of claim 10, wherein to compare the first image data and the second image data to the image profile data, the processor is configured to:
perform a facial recognition analysis using the first image data, the second image data, and the image profile data, and
based on a result of the facial recognition analysis, determine that the operator of the vehicle is depicted in the first image data and the second image data.

12. The system of claim 8, wherein to identify the current time the processor is configured to:
identify the current time and a current date;
and wherein to generate the vehicle operation log, the processor is configured to:
generate the vehicle operation log to indicate the operator of the vehicle, the current time, the route information, and the current date.

13. The system of claim 8, wherein to detect that the vehicle is operating, the processor is configured to:
retrieve the location data from the location module, and
determine, from the location data, that the vehicle is currently in motion.

14. The system of claim 8, wherein to detect that the vehicle is operating, the processor is configured to:
receive, from an on-board sensor of the vehicle, an indication that the vehicle is in motion.

* * * * *